(12) United States Patent
Nakamura et al.

(10) Patent No.: US 6,555,013 B2
(45) Date of Patent: Apr. 29, 2003

(54) TREATMENT METHOD FOR THINGS LIKE SLUDGE AND TREATMENT APPARATUS

(75) Inventors: Shinichi Nakamura, Osaka (JP); Kunihiko Fukuzuka, Osaka (JP); Kenji Nagayoshi, Osaka (JP)

(73) Assignee: Omega Co., Ltd. (JP)

( * ) Notice: Subject to any disclaimer, the term of this patent is extended or adjusted under 35 U.S.C. 154(b) by 0 days.

(21) Appl. No.: 09/875,768

(22) Filed: Jun. 6, 2001

(65) Prior Publication Data

US 2002/0190009 A1 Dec. 19, 2002

(51) Int. Cl.⁷ .................... C02F 11/06; C02F 11/12
(52) U.S. Cl. ............. 210/769; 210/771; 210/780; 210/386; 210/387; 100/37; 100/120; 100/121; 100/153; 110/224; 110/346; 34/399; 34/444; 34/452; 34/487; 34/502; 34/521; 34/86; 34/95.3; 34/144; 34/145; 34/625
(58) Field of Search ............... 210/768, 769, 210/770.771, 780, 783, 386, 387; 34/385, 397, 398, 399, 443, 452, 487, 502, 521, 86, 95.3, 144, 145, 618, 625; 100/37, 120–121, 152–153; 110/224, 346

(56) References Cited

U.S. PATENT DOCUMENTS

| | | | |
|---|---|---|---|
| 2,796,810 A | 6/1957 | Muller | 92/39 |
| 3,654,074 A | 4/1972 | Jacquelin | 162/213 |
| 3,747,766 A | 7/1973 | Brooks | 210/259 |
| 3,914,080 A | 10/1975 | Kamp | 425/83 |
| 4,039,450 A | 8/1977 | Brown | 210/77 |
| 4,131,546 A | 12/1978 | Olsson et al. | 210/77 |
| 4,229,202 A | 10/1980 | Mullerheim et al. | 71/8 |
| 4,260,496 A | 4/1981 | Beer | 210/780 |
| 4,501,669 A | 2/1985 | Hakannson et al. | 210/770 |
| 4,518,507 A | 5/1985 | Conner | 210/747 |
| 4,681,688 A | 7/1987 | Sondov et al. | 210/770 |
| 4,867,873 A | 9/1989 | Akazawa | 210/106 |
| 5,177,335 A | 1/1993 | Hartwig et al. | 219/69 |
| 5,439,598 A | 8/1995 | Clough | 210/770 |
| 5,520,824 A | 5/1996 | Sasaki | 210/780 |
| 5,725,783 A | 3/1998 | Hoden | 210/770 |
| 6,146,540 A | 11/2000 | Nakamura et al. | 210/745 |
| 6,241,900 B1 | 6/2001 | Nakamura et al. | 210/769 |

FOREIGN PATENT DOCUMENTS

| | | | |
|---|---|---|---|
| DE | 29 50 497 | 6/1981 | A01J/25/11 |
| GB | 2 065 487 | 7/1981 | A01J/25/11 |

*Primary Examiner*—Robert J. Popovics
(74) *Attorney, Agent, or Firm*—Hayes Soloway P.C.

(57) ABSTRACT

A method and apparatus for treating an aqueous-containing sludge in which the sludge is filtered on an elongate moving sheet of a water permeable unwoven fabric on paper. The moving sheet is folded and compressed between rollers whereby to express water therefrom. The folded moving sheet and contained sludge is dried, and the dried sheet and sludge is incinerated. Combustion heat from the incineration step is used in the drying step.

12 Claims, 3 Drawing Sheets

FIG. 1
FIG. 2
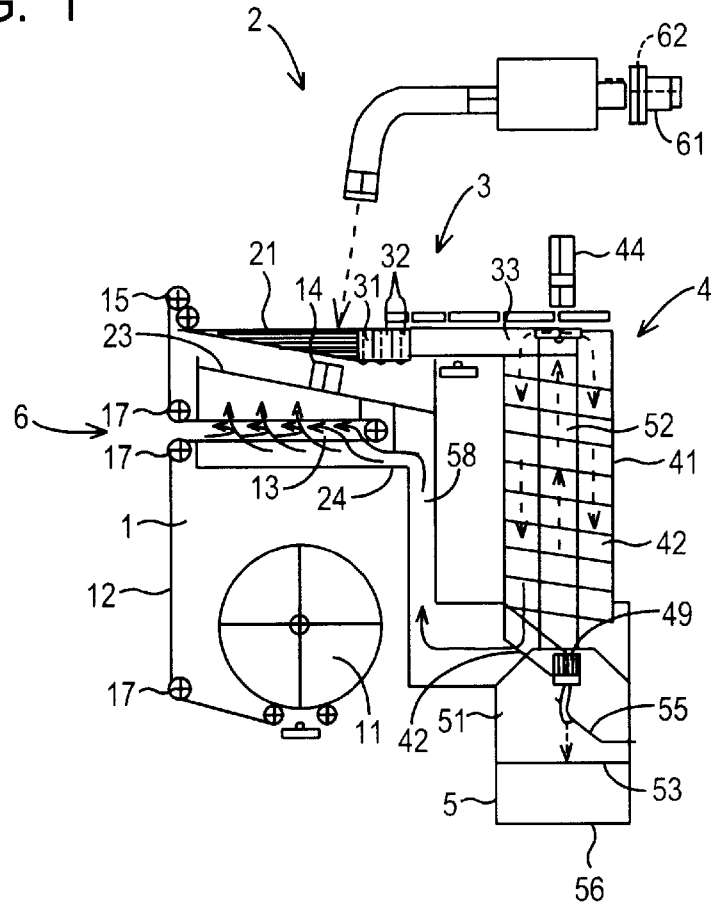
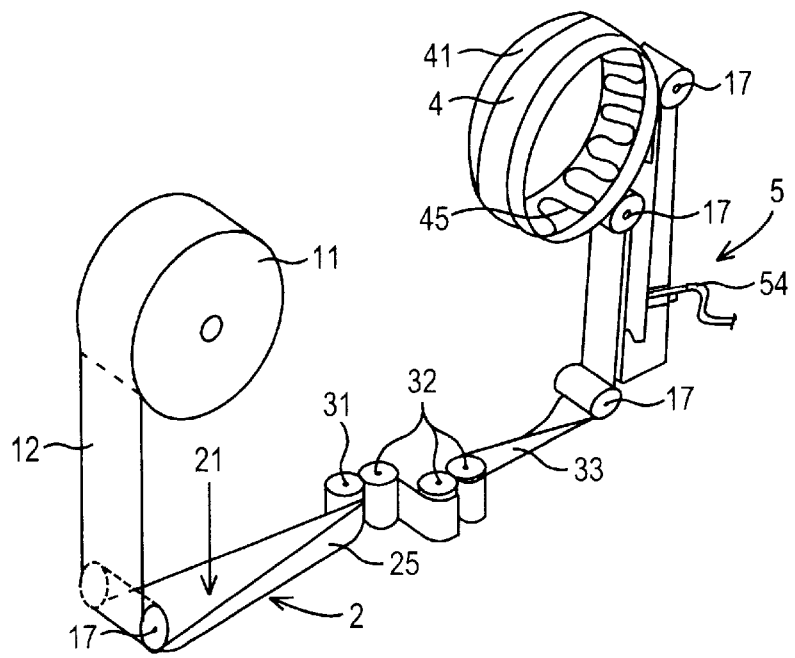

TREATMENT METHOD FOR THINGS LIKE SLUDGE AND TREATMENT APPARATUS

BACKGROUND OF THE INVENTION

This invention pertains to a system for treating water containing substances or organic solvent containing substances that is small-scale, simple and very effective, using a gas permeable, water permeable sheet, that can dehydrate or remove solvent, dry and incinerate biological waste with a large organic solvent content or water content or sludge or sludge-form that is recovered from water containing substances, machine wash (run-off) liquid waste and storage tanks from chemical apparatus, waste water treatment apparatus, sewage and waste disposal processes, and substances such as sewers, rivers, lakes, marshes, harbors, stocked ponds or cisterns.

BRIEF DESCRIPTION OF THE PRIOR ART

Previously, there were problems such as using things like a filter press, belt press or drum type suction dehydrator for filtering and dehydrating water containing substances such as sludge that were recovered from chemical apparatus, waste water treatment, drying, incinerating, sewage, and waste disposal processes and sewers, rivers, lakes, marshes, harbors, stocked ponds or cisterns, because of the expense of these, and the necessity of using a specific drying apparatus for drying the previously dehydrated sludge.

Disposal by reclaiming is a common practice for final disposal of industrial waste, but is unusually complex for dehydration of 85% or less that necessitates the use of dehydration apparatus. As in the prior art, for things like waste water treatment and industrial waste water treatment facilities due to requiring a water content of 85% or less by dehydration when incinerated by disposal standards by reclaiming in practice, and the requirement of a reclaiming disposal after incineration treatment by public or private disposal incineration facilities being left to the industry for dehydrated sludge was a problem. Currently, diffusion of combined treatment layers is advanced such as waste water treatment being possible at the source generating the waste water, but requiring another dehydration and incineration is a problem during conveyance to a waste disposal facility by vacuum curing by storage in a storage tank for sludge that is output from a sludge concentrating apparatus with sludge treatment being further complicated in practice.

These inventors applied for:
(1) Japanese Patent Application No. H10-193773, "Waste Disposal System Using Waste-Holding Pouch to Waste-Holding Pouch";
(2) Japanese Patent Application No. H10-254512, "Waste Water Treatment Method and Its Treatment Device";
(3) Japanese Patent Application No. H10-268924, "Floatation Elimination Recovery Treatment Method on Water Surface and Its Treatment Apparatus";
(4) Japanese Patent Application No. H10-340973, "A Waste Water Combined Treatment Cleaning System and Its Combined Treatment Washing Apparatus"; and
(5) Japanese Patent Application No. H11-76433 "Sludge Treatment System and Its Treatment Apparatus", for solving these problems with methods and apparatuses that draw out a long unwoven fabric that is wound in a roll and that filters, dehydrates and dries by carrying water containing substances like sludge on it.

The above methods and apparatuses and unusually effective for many combined treatment of sludge, cohesive treatment sludge, fluid oils that float on the water surface and plankton (red tide), but the drying period is long due to the wringing after filtering being inadequate for water containing sludge of the one part, and sludge that comes off the sheet in drying processes for water containing items, and the soot elimination in exhaust gas that is output from incineration processes of dried sheet sludge is a problem.

Unusually harmful substances such as dioxin are byproducts due to incineration methods for water containing waste such as sludge and slurries, and the possibility of preventing the byproducts by raising the incineration temperature is well known; however, the complexities for increasing the incineration temperature by a small-scale, simple incineration apparatus is a problem.

OBJECTS OF THE INVENTION

Objects of the invention are to provide a process and apparatus for treatment of water containing waste like sludge or biological waste or organic solvent containing waste, of any kind or substance, which can continuously be removed with a long unwoven fabric sheet, and simple filtering, dehydration and drying can be done with removed substances being carried on the fabric sheet, wherein the removed substances do not come off the fabric sheet during elimination. Another object of the invention is to provide a method and a small-scale inexpensive apparatus that can perform simple elimination of substances such as soot of exhaust gas or flue gas.

SUMMARY OF THE INVENTION

An apparatus and method are provided by this invention for solving the aforementioned problems.

BRIEF DESCRIPTION OF THE DRAWINGS

FIG. 1 is a process diagram that shows the several process steps and stations of the present invention;

FIG. 2 is a diagrammatic view that shows details of the folding by a guide roller by horizontal stretching in a filtering step and station portion of the present invention;

DETAILED DESCRIPTION OF THE INVENTION

Figure 3:
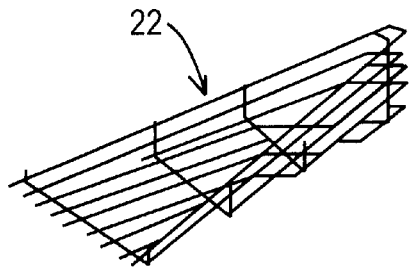
FIG. 3 is a diagonal view of a sheet support means portion of the present invention.

Referring to the drawings, according to one aspects of the invention, a sheet, which is suspended and which carries sludge, hangs down from the weight of the sludge in a swollen form when a supply of unwoven fabric or paper is used in a continuous removing filtering step or station 2 with a long unwoven fabric or paper that is wound on a roll and is supplied for things like sludge on it. Under the sheet as a cross section in the advancing direction of the sheet is a hamper, metal net or carriage from support means 22 (see FIG. 3) which is a U-shaped water permeable device that is open on top, and in which the width becomes narrow and thick (in depth) as it advances, and its cross-sectional shape changes with the shape of the support means for the unwoven fabric sheet that carries the filtered sludge.

Figure 4:
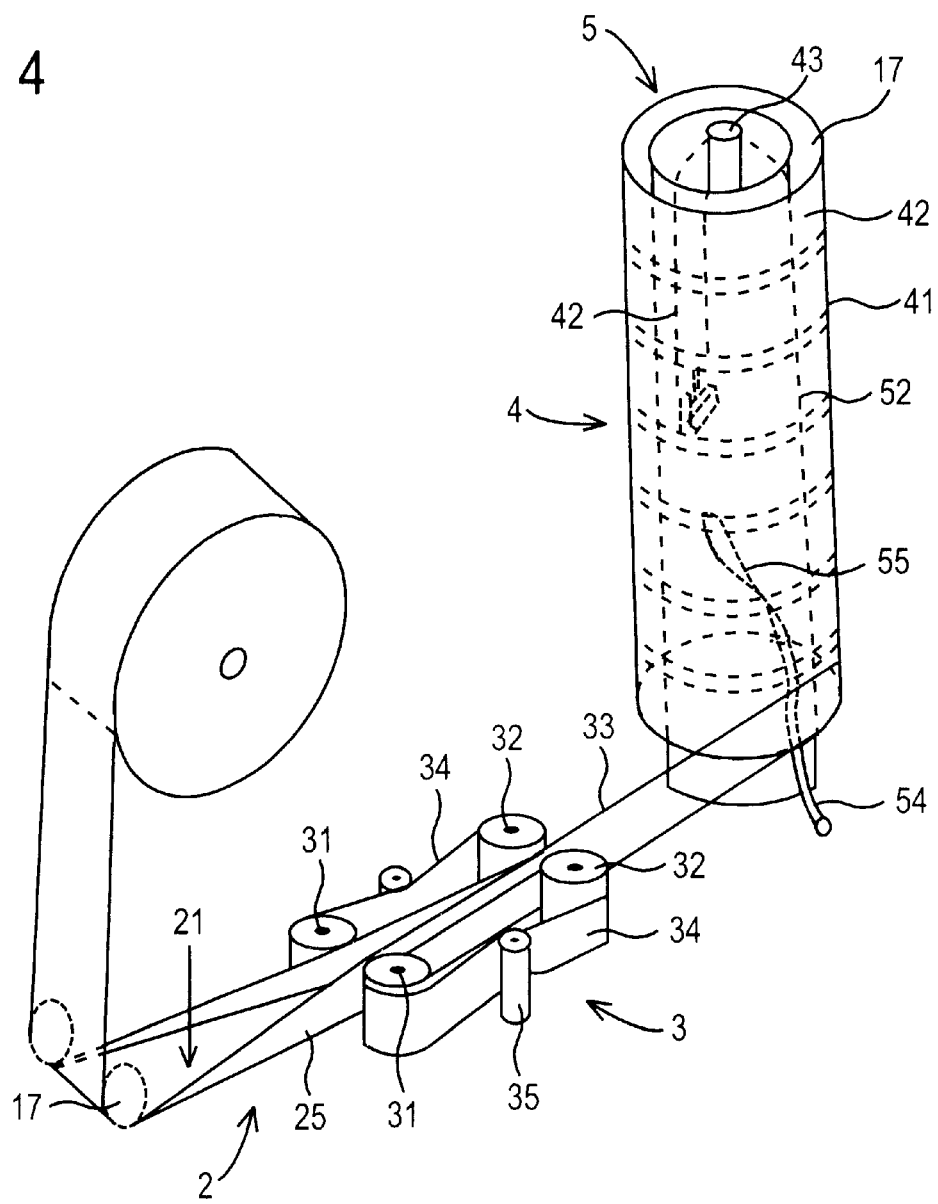
FIG. 4 is a diagrammatic view that shows portions of the dehydration step and station and drying step and station of the present invention.
Figure 5:
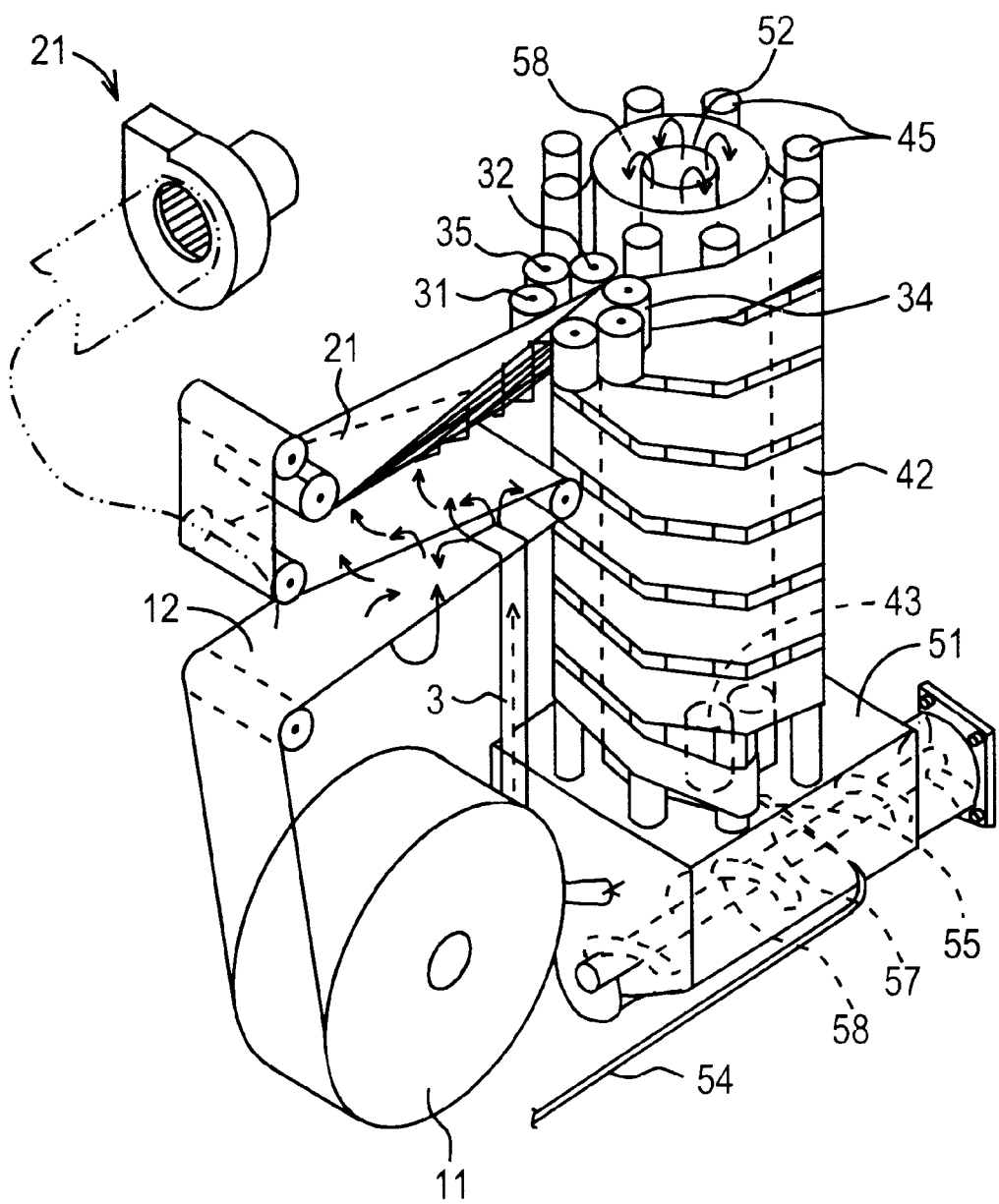
FIG. 5 is a diagrammatic view that shows the various steps and stations of the present invention.

Referring in particular to FIGS. 2 and 4, the sheet 25 that carries the filtered sludge is dehydrated by wringing in a dehydration step or station 3 by means of a guide roller 31 and wringing rollers 32. Preferably, the sheet is formed of the unwoven fabrics such as cellulose types and polyester types that are relatively low cost, and biodegradable materials such as durable paper or unwoven biodegradable fabrics that are like paper and may be reclaimed without incineration.

Thus, a sheet 25, which carries water containing substances such as sludge, is subjected to a continuous dehydration treatment in dehydration step or station 3, and there is a possibility that the sheet may break while being pulled in drying step or station 4 by pulling roller 43. However, with the present invention, this is prevented since, as shown in FIG. 4, the filtered sludge sheet 25 is sandwiched by water permeable wringing belts 34 that endlessly rotate and grip the sheet from both sides, and advance in the same direction, and cylindrical shaped rollers 32, which compress and dehydrate the sludge sheet by means of belts 34.

The wringing rollers 32 are provided as two or more pairs, and the sludge, which is contained between two folds of sheet 25, open at the top, like a Nagoya belt, and there is successive dehydration by successive sandwiching intervals of the rollers since the incremental pressing pressure can be increased; flowability does not accompany that, and things like sludge do not overflow and spill out even under strong compression.

A dehydrated sheet 25 is wound up from one end of a rotating cylinder that is heated for drying use in the following drying step or station 4, and advances to the other end in a helical fashion on the outer circumference of the cylinder rotating a number of times; the dried sludge sheet 42 is introduced into incineration container 51 by being pulled by pulling rollers 43. The upper section of incineration tube 52 is located inside of the rotating drying cylinder 41, and the heat of the radiated heat and the heat of the exhaust gas that are generated by the incineration tube can be utilized for drying.

A plurality, e.g., three to twenty drying cylinders 45 are positioned around a circle. Preferably 4 to 16 pipes or thin cylindrical rollers, more preferably 6 to 12 rotating pipes or rollers, are arranged parallel to the outside surface of the incineration tube. Preferably only the outer walls or pipes or thin cylindrical rollers with one each on the outer wall and inner wall, rotate a number of times helically in the direction from up to down on the arranged circumferences. Alternatively, disks may be employed in place of cylinders for pulling and drying the sheet in the drying device.

The dried sludge sheet preferably is moved with the outer circumference of the plurality of rotating rollers that are positioned for the drying cylinders or disks in a helical revolving advancement from down to up, not just advancing from up to down; also, not only vertical, but horizontal or slanted positioning is also fine for things like drying cylinders, and they also can be used by providing two-fold or more when a plurality of rotating disks are used instead of cylinders.

Heating the drying cylinder utilizing the heat of radiated heat or exhaust gas that is generated by an incineration tube for drying is preferred. However, the use of ordinary heating devices like electric heat, and circulating steam and hot water is also fine.

The incineration step or station is located within or after the drying step or station 4, and is provided with a configuration such as can effectively utilize the combustion heat of the dried sludge sheet. The advancing dried sludge sheet 42 is burned from the end by small flame of ignition burner-auxiliary burner 54 that is provided within incineration container 51 or incineration tube 52, and the ashes can be stored by the lower ash collection plate 53.

High heat is generated by aluminum and iron oxide or other metal oxide exothermically reacting by the incineration heat of the dried sludge sheet when the sludge is heated in filtering step or station 2 or when substances such as powder or flakes of aluminum and iron oxide or other metal oxides are heated in incineration container 51 for increasing the combustion temperature of the incineration process for preventing the generation of dioxin. Thus, harmful substances such as dioxin are not generated, notwithstanding that substances such as organic chloride compounds are contained in the sludge, due to high combustion temperature that exceed 800° C.

Thus, powders or fine flakes of aluminum and iron oxide or other metal oxides, which are initially independent or mixed, may be incorporated on the aforementioned filter sheet, water permeable unwoven fabrics or durable treated paper.

The exhaust and flue gas from the incineration step or station 5 are exhausted into the atmosphere through a smokestack from a duct after being utilized for heating and drying of drying cylinder 41. The exhaust elimination step or station 6 that is employed has a construction such that a new sheet 12, before being used for filtering sludge by being drawn from a roller, moves by transversing the exhaust or flue gas ducts, and the exhaust or flue gas passes through the unwoven fabric or paper, whereupon soot that may be contained in the flue gases is eliminated by filtering through the sheet 12 of unwoven fabric or paper.

Actual embodiments of the invention are explained by referring to the figures that are based on the following examples.

EXAMPLE I

FIG. 1 is a system flow chart that shows actual configuration and functions of all basic steps and systems from unwoven fabric or paper supply step or station 1, filtering step or station 2, dehydration step or station 3, drying step or station 4, incineration step or station 5, to exhaust elimination step or station 6.

An unwoven fabric or paper sheet 12 that is wound on a roll is positioned on two free rollers. A sheet driving device comprising pulling rollers 43 and drivable guide rollers 17 continuously draw out from roll 11, and the sheet is sent through a sequence of stations 1–> 6–> 2–> 3–> 4–> 5. Guide rollers 17 are not always driven, and may be used as free rollers for part of the process.

An advancing sheet 12, having properties including durability and water permeability, is arranged on guide rollers 17, and passed through exhaust elimination station 6, to filtering station 2, where the sheet 12 is stretched horizontally on support means 22, and swells and hangs down from the weight when substances such as sludge pour from a supply nozzle 21 onto the sheet, and is supported by sludge sheet support means 22. Sludge sheet support means 22 comprises a metal mesh, which is durable and has a U-shaped cross-section and which is located under the sheet, such that the sludge that is filtered by a sheet, which is water permeable, is moved along carried on the sheet, while the filtered filtrate is received on a receiving plate 23, located beneath the sludge sheet support means 22, where the filtered filtrate may be discharged externally via a filtrate discharge port 24.

The advancing sheet carrying the filtered sludge 25 is contacted, with compressing and wringing, by guide rollers in dehydration station 3. The resulting dehydration sludge sheet 33 that has the water part of the sludge substantially wrung out is advanced to drying station 4, where it is heated and dried by the waste heat of radiated heat and exhaust of incineration station 5 while being carried on the outer circumference of heated drying cylinder 41 helically revolving in a direction from one end to the other end. This resulting dried sludge sheet 42 is pulled by a sheet driving device pulling roller 43 that is on the lower section of drying cylinder 41, and, further, is fed into incineration station 5.

A small-scale burner 54 is provided for ignition within incineration station 5. The dried sludge sheet 42 is fed into the incineration station 5, where it is lit and burned by ignition burner 54. The elongated sheet of unwoven fabric or paper that surrounds the dried sludge begins burning and the dried sludge is simultaneously burned. The burned-up sludge sheet falls on the fire grating 56 that is underneath and is burned, and the burned ashes are stored in the ash collection vessel 57 that is under fire grating 56.

The exhaust and flue gas from the drying station 4 and incineration station 5 are drawn by an exhaust fan 61 that is positioned between the duct and the smokestack and exhaust externally from the smokestack. The unwoven fabric sheets 13, 14, before being used for filtering, are drawn from the roll and are introduced to guide roller 17 that is positioned within the exhaust duct of the exhaust and flue gas elimination station 6, and doubled back within the duct, that is, in the exhaust and flue gas elimination station 6, and advanced. The exhaust and flue gas that pass within the duct are supplied between the sheets 13 and 14. Soot adheres to the surface of the sheet before the sheet enters into the filtering station 2.

EXAMPLE II

Conditions beyond the sludge sheet support means 22 are shown in FIG. 2. FIG. 3 shows the sludge sheet support means 22, which is a metal-type or plastic-type perforated plate with small holes or slits. The sludge carrying sheet 25 that sandwiches the sludge is positioned such that the rotational axis is vertical, and advances by passing between wringing rollers 31, 32 that may be one pair or a plurality of pairs in corresponding sets of two.

The first pair of the four rollers 31, 32 in FIG. 2 are arranged linearly in the advancing direction of sheet 12. Since the spacing between the rollers is small, the sheet passing between the rollers is compressed and wrung by the four rollers. Preferably, three to five or more pairs of rollers are provided. The wringing pressure is further increased by sequentially narrowing the spacings between pairs of rollers as the thickness of the sheet becomes smaller due to wringing out the water portion.

This example is constructed with test situations for determining the treatment conditions of the filtering step, dehydration step and drying step. Heat is provided by an electric heater inside of drying tank 41. Tests are performed for: (1) sedimentation sludge of combined treatment layers; (2) ice cream waste liquid; (3) household biological garbage disposal-treated waste. The results are shown in Table 1 below:

TABLE 1

Water Content of Each Process (%)

| I-Process | 1 | 2 | 3 |
|---|---|---|---|
| Crude liquid | 98.5 | 86.8 | 84.4 |
| After filtering | 91.5 | 78.3 | 76.2 |
| After dehydration | 84.2 | 61.7 | 68.8 |
| After dying | 38.4 | 48.6 | 39.5 |

1 Sedimentation Sludge of Combined Treatment
2 Ice Cream Waste Liquid
3 Household Biological Garbage Disposal-Treated Waste Test Conditions
1. Utilized Unwoven Fabric:
   Taiko TCF #6025 Material: Cellulose-type
   (Weight per Area: 25 g/m$^2$. Sheet Width: 20 cm)
2. Crude Liquid Treatment Amount was 50 ml/min for sedimentation sludge and was 80 ml/min for ice cream waste liquid and for household biological garbage disposal-treated waste.

The treatment effectiveness varied according to the crude liquid. The water content that can be ignited by an ignition burner after drying when previously determined experimentally was 40% and less for sedimentation sludge and for household biological garbage disposal-treated waste, and 50% and less for ice cream waste liquid.
3. The sheet advancing rate was established at 4 cm/mm for ice cream waste liquid, and at 35 cm/mm for sedimentation sludge and for household biological garbage disposal-treated waste. treated waste.
4. The outside surface temperature of the drying tank 41 was controlled to be 100–105° C.

A method by which the guide rollers compress and wiring through direct contact with a sheet that carries sludge that was filtered as shown in FIG. 2 will be explained. Breaking and leaking depends on a variety of conditions such as the type of sludge and the type of fabric. Also, as in FIG. 4, while both sides of the sheet were sandwiched and maintained by a water permeable endless belt that advances at the same rate in the same direction as the sheet, this was done in such a way as indirect wringing is done by wringing rollers 32 on the outside. While one pair of wringing rollers 32 has been shown, two or more pairs of wringing rollers may be used with increasing wringing pressure.

Example III

Two dried sludge sheets are combined and introduced into a simple incineration station by means of three 120 cm long vertical pipes rollers arranged in a circle under the following conditions:

Operating Conditions
1. Utilized Unwoven Fabric:
   Taiko TCF #6025 Material: Cellulose Type
   (Weight per Area 25 g/m$^2$, Sheet Width 20 cm, Roll Diameter 90 cm, Length 2000 m)
2. Apparatus Conditions
   Dimensions: Width 215 cm Depth 48 cm Height 175 cm
   Treated Length of Sheet During Process:
   Filtering Process 60 cm Dehydration Process 36 cm
   Drying Process 1260 cm The results are shown in Table 2 below:

TABLE 2

Water Content (%) and incineration Produced (%)

| I-Process | Units | 1 | 2 |
|---|---|---|---|
| Crude liquid water content | % | 98.5 | 86.8 |
| After filtering water content | % | 92.3 | 78.7 |
| After dehydration water content | % | 83.1 | 60.1 |
| After drying water content | % | 36.7 | 44.8 |
| Incineration ash produced | % | 1.42 | 0.85 |
| Crude liquid flow rate | ml/min | 350 | 150 |
| Sheet feeding rate | cm/min | 35 | 4 |
| Treated amount 1 line | 1/day (24 H) | 504 | 216 |
| Treated amount 2 lines | 1/day (24 H) | 1008 | 432 |

1 and 3 are 40% or less
2 is 50% less

Ice cream liquid waste is easily lit since the oil and fat content oozes from the surface by heating.

The sedimentation sludge which was without water component, well dried, comparable to Example II, as shown in Table 2, was easily lit by ignition burner. Further, a form with excessive oil did not have overflow when the water part was removed in the case of ice cream waste liquid, and was easily lit and hotly burned when the water content was less than 50%.

The actual example, which is shown in FIG. 4, adds 0.03% commercial thermite agent (aluminum powder and iron oxide powder mixture) to sludge with a water content of 98.5% for the previously existing sludge when treating sludge that has a risk due to containing organic chlorine compounds. The thermite agent is stirred and mixed well into the sludge, and the thermite agent is added in an amount such that there is an addition ratio of 2% based on the dried sludge.

The combination temperature is 650° C. when a thermite agent is not added, while when the thermite agent is added the combustion temperature increases to 865° C. inside the burning tube 51, and can be maintained at the 800° C. and above, which is the minimum combustion temperature for waste incineration of dioxin established by the guidelines of the Japanese Welfare Ministry.

This invention provides several advantages as described below.

For one, the invention presses on sludge without overflowing, even though it is very packed, by supporting an unwoven fabric sheet carrying sludge by positioning a support means under a sludge sheet with a sludge poured on the unwoven fabric sheet. Heating and drying of the sludge carrying sheet are simple. A dehydration sludge sheet is heated as a long belt form and wound by a cylinder, and can be continuously incinerated by delivery to an incineration tube.

The invention avoids damage to the sludge bearing sheet by indirectly pressing on the sheet over a wide surface area by a rotating belt. This solves the problem of sludge sheet breakage and permits increased wringing pressures.

The invention is efficient in terms of space requirements and energy costs, since waste heat from the incineration tube exhaust is utilized. Also, the drying capacity can be increased by simultaneously drying a plurality of sheets. The drying station includes a plurality of pipes provided in a circle form and results in a two-fold or three-fold increases in dryer capacity.

The invention can eliminate soot from the exhaust and flue gas from the drying station and incineration station by a simple method of passing the gas through fresh unwoven fabric before it is used to collect the sludge.

The invention can be utilized for filtering of substances such as sludge on a wide sheet which is then folded and the water wrung out.

According to another aspect of the invention, aluminum and iron oxide powder may be added to the sludge or adhered to the unwoven fabric or water permeable sheet. Thus, in the subsequent incineration step, a combination temperature that is as high as 800° C. or above, can be achieved whereby to prevent the generation of dioxin even though organic chloride compounds may be contained in the sludge.

We claim:

1. A method for treating an aqueous-containing sludge comprising the steps of:
    (a) filtering the sludge on an elongate moving sheet of a water permeable unwoven fabric or paper;
    (b) folding and compressing the moving sheet between rollers whereby to express water therefrom;
    (c) drying the folded moving sheet and contained sludge; and
    (d) incinerating the derived sheet an sludge, wherein combustion heat from the incineration step is used in the drying step.

2. A method according to claim 1, wherein a thermite comprising a mixture of aluminum and iron oxides is mixed with the sludge in order to increase the combustion temperature in the incineration step.

3. A method according to claim 2, wherein said thermite comprises a mixture of aluminum and iron oxide powders.

4. A method according to claim 1, wherein a thermite comprising a mixture of aluminum and iron oxide is adhered to the water permeable unwoven fabric or paper whereby to increase the combustion temperature in the incineration step.

5. A method according to claim 4, wherein said thermite comprises a mixture of aluminum and iron oxide powders.

6. A method according to claim 1, and including the step of passing exhaust from the incineration step through the elongate moving sheet whereby to remove soot therefrom.

7. An apparatus for treating aqueous-containing sludge wherein the sludge is filtered on an elongate moving sheet of a water permeable unwoven fabric or paper, said apparatus comprising, in combination:
    a U-shaped water permeable support, open at its top, for supporting the permeable sheet and guiding the sheet into a folded position;
    at least one pair of wringing rollers for wringing water from the moving sheet;
    a drying station comprising a rotating drying cylinder around which the moving sheet is helically wound; and
    an incineration station, wherein combustion heat from the incineration station is used in the drying station.

8. An apparatus according to claim 7, wherein said U-shaped support is tapered from an inlet, and wherein the moving sheet may enter the support flat, to an outlet wherein edges of the sheet are folded up.

9. An apparatus for treating aqueous-containing sludge wherein the sludge is filtered on an elongate moving sheet of a water permeable unwoven fabric or paper, said apparatus comprising, in combination:
    a U-shaped water permeable support, open at its top, for supporting the permeable sheet and guiding the sheet into a folded position;
    at least one pair of wringing rollers for wringing water from the moving sheet;

a drying station comprising a plurality of rotating rollers with their axes located in a circle, wherein the moving sheet is helically wound around the periphery of the circle; and an incineration station, wherein combustion heat from the incineration station is used in the drying station.

10. An apparatus according to claim 9, wherein said U-shaped support is tapered from an inlet, and wherein the moving sheet may enter the support flat, to an outlet wherein edges of the sheet are folded up.

11. An apparatus for treating aqueous-containing sludge wherein the sludge is filtered on an elongate moving sheet of a water permeable unwoven fabric or paper, said apparatus comprising, in combination:

a U-shaped water permeable support, open at its top, for supporting the permeable sheet and guiding the sheet into a folded position;

at least one pair of wringing rollers for wringing water from the moving sheet;

a drying station;

an incineration station, wherein combustion heat from the incineration station is used in the drying station; and a conduit for directing exhaust from the incineration through the permeable sheet whereupon soot contained therein may be removed.

12. An apparatus according to claim 11, wherein said U-shaped support is tapered from an inlet, and wherein the moving sheet may enter the support flat, to an outlet wherein edges of the sheet are folded up.

* * * * *

UNITED STATES PATENT AND TRADEMARK OFFICE
CERTIFICATE OF CORRECTION

PATENT NO. : 6,555,013 B2
DATED : April 29, 2003
INVENTOR(S) : Nakamura et al.

It is certified that error appears in the above-identified patent and that said Letters Patent is hereby corrected as shown below:

<u>Title page,</u>
Item [57], ABSTRACT,
Line 3, change "fabric on paper" to -- fabric or paper --.

<u>Column 8,</u>
Line 1, change "derived sheet an sludge" to -- dried sheet and sludge --.

<u>Column 10,</u>
Line 6, change "incineration" to -- incinerator --.

Signed and Sealed this

Fourteenth Day of December, 2004

JON W. DUDAS
*Director of the United States Patent and Trademark Office*